(12) United States Patent
Liu

(10) Patent No.: US 10,661,525 B2
(45) Date of Patent: May 26, 2020

(54) CURVED FILM FOR MOBILE PHONE AND PRODUCTION METHOD THEREOF

(71) Applicant: Wing Tak Lee Silicone Rubber Technology (Shenzhen) Co., Ltd, Shenzhen, Guangdong (CN)

(72) Inventor: Tak Nam Liu, Guangdong (CN)

(73) Assignee: Wing Tak Lee Silicone Rubber Technology (Shenzhen) Co., Ltd, Shenzhen (CN)

(*) Notice: Subject to any disclaimer, the term of this patent is extended or adjusted under 35 U.S.C. 154(b) by 44 days.

(21) Appl. No.: 15/957,854

(22) Filed: Apr. 19, 2018

(65) Prior Publication Data

US 2019/0322071 A1 Oct. 24, 2019

(51) Int. Cl.
*B32B 3/26* (2006.01)
*B32B 17/06* (2006.01)

(52) U.S. Cl.
CPC .......... *B32B 3/263* (2013.01); *B32B 17/064* (2013.01); *B32B 2250/03* (2013.01); *B32B 2307/70* (2013.01); *B32B 2457/208* (2013.01)

(58) Field of Classification Search
CPC .......... B32B 2457/20; B32B 2457/202; B32B 2457/204; B32B 2457/206; B32B 2457/208; B32B 3/26; B32B 3/263
See application file for complete search history.

(56) References Cited

U.S. PATENT DOCUMENTS

| | | | | |
|---|---|---|---|---|
| 2010/0040842 A1* | 2/2010 | Everaerts | ............... | B32B 37/12 428/201 |
| 2017/0150628 A1* | 5/2017 | Amin | ................... | C03C 21/005 |
| 2018/0312623 A1* | 11/2018 | Wang | ................. | C08G 18/3234 |

\* cited by examiner

*Primary Examiner* — Scott W Dodds

(57) ABSTRACT

The present disclosure provides a curved film for a mobile phone. The curved film from top to bottom includes in sequence a curved glass layer, a thermoplastic urethane (TPU) layer, an explosion-proof film and an adhesive layer. The technical scheme provided by the present disclosure has benefits of shock proofing and low cost.

1 Claim, 2 Drawing Sheets

CURVED FILM FOR MOBILE PHONE AND PRODUCTION METHOD THEREOF

TECHNICAL FIELD

The present disclosure relates to the field of mobile phone accessories, and in particular to a curved film for a mobile phone, and the production method of the curved film.

BACKGROUND

Mobile phones, also called wireless phones, are generally called cell phones now. The mobile phones originally served as communication tools only. In the early days, the mobile phones are commonly known as cell phones, which are portable phone terminals that can be used in a wide range. The mobile phones are first developed from the battlefield mobile phones manufactured in the American Bell Laboratory in 1940.

Nowadays, mobile phones have become more than just phone calls. Phone call has now become the most basic function of mobile phones, especially with the advent of smart phones, in which more and more applications are installed. Mobile phones have become the most frequently used electronic device for users. Meanwhile, touch screens also become the most frequently used part of mobile phones. With the advent of flat screen, curved screen and full screen, the shape of the touch screen changes too, on the other hand, the touch screen gets higher and higher in the proportion of its price to the total price of the mobile phone. Therefore, it is more and more important to protect the touch screen of mobile phones. For mobile phones having curved screens, it is needed to provide curved films to protect the curved screens. However, existing curved films for mobile phones cannot protect the curved screens effectively, thereby resulting in poor user experience.

SUMMARY

The present application provides a curved film for a mobile phone, and a production method of the curved film. The structure of the curved film enhances the protection performance for a mobile phone screen and can improve user experience.

According to the first embodiment, the present disclosure provides a curved film for a mobile phone. The curved film from top to bottom includes in sequence a curved glass layer, a thermoplastic urethane (TPU) layer, an explosion-proof film and an adhesive layer.

Preferably, the TPU layer includes a central region and four corners, wherein the four corners each has a thickness greater than that of the central region.

According to the second embodiment, the present disclosure provides a manufacture method for the curved film, which comprises the following steps:

bonding the curved glass layer, the TPU layer and the explosion-proof film together to form a semi-finished product; and rolling an adhesive roller on the lower surface of the semi-finished product to form the adhesive layer.

Preferably, the step of rolling the adhesive roller on the lower surface of the semi-finished product to form the adhesive layer includes:

rolling the adhesive roller on the lower surface of the curved explosion-proof film to form the adhesive layer, wherein the gap between the central axis of the adhesive roller and the central region of the lower surface of the explosion-proof film may be a constant C, the gap L1 between the central axis of the adhesive roller and a first edge region of the lower surface of the explosion-proof film is $L1=C+lg(w-m+1)$, wherein m maybe a distance from the point y1 of the first edge region in contact with the edge of the adhesive roller to a bottom line of the explosion-proof film, and w maybe the maximum value of the first edge region in the direction of x axis; the gap between the central axis of the adhesive roller and a second edge region of the lower surface of the explosion-proof film is $L2=C+lg(s-n+1)$, wherein n may be a distance from the point y2 of the second edge region in contact with the edge of the adhesive roller to a top line of the explosion-proof film, and s is a maximum value of a special-shaped region in the direction of x axis.

Preferably, the four corners of the TPU layer each has a thickness greater than that of the central region, and the production method for the TPU layer includes the following:

adding a preset set amount of polyether diol and diisocyanate into a reaction vessel, heating the reaction vessel to 85 degrees centigrade while stirring at a rotating speed of 10 round per second (rps), vacuumizing the reaction vessel so that the vacuum degree is lower than −0.08 Mpa and then staying still for 1 hour; then adding a preset amount of diol chain-extender, vacuumizing the reaction vessel while stirring at a rotating speed of 20 rps so that the vacuum degree is lower than −0.1 Mpa, heating the reaction vessel to 120 degrees centigrade, reducing the rotating speed from 20 rps to 10 rps evenly and keeping at 10 rps for 30 minutes, and then stopping stirring and releasing vacuum; and then, adding polytetrafluoroethylene, heating to 125 degrees centigrade, then keeping for 4 hours at 125 degrees centigrade, and then naturally cooling to obtain the TPU; and cutting the TPU on the central region of the reaction vessel into a preset size to obtain the TPU layer, putting the TPU on the edge region of the reaction vessel into a heating print head of a 3D printer and heating to 130 degrees centigrade, controlling the print head of the 3D printer to print a thickened layer with a preset thickness at the four corners of the TPU layer of the preset size, and cooling to obtain the TPU layer.

The curved film manufactured by the method of the present application is provided with a TPU layer, and this TPU layer can significantly improve the mechanical strength of the curved film, thereby effectively protecting the display screen of mobile phones. Therefore, the TPU layer forms an effective protection for the curved film and can improve user experience.

BRIEF DESCRIPTION OF THE DRAWINGS

To better describe the technical scheme in the embodiment of the present disclosure, accompanying drawings needed in the description of the embodiments are simply illustrated below. Obviously, it should be appreciated that the accompanying drawings described hereinafter illustrate some embodiments of the present application. For the ordinary skill in the field, other accompanying drawings may be obtained according to these accompanying drawings without creative work.

DESCRIPTION OF THE EMBODIMENTS

A clear and complete description as below is provided to the technical scheme in the embodiments of the present disclosure in conjunction with the accompanying drawings in the embodiments of the present disclosure. Obviously, the embodiments described hereinafter are simply part embodiments of the present disclosure, but all the embodiments. All other embodiments obtained by the ordinary skill in the art based on the embodiments in the present disclosure without creative work are intended to be included in the scope of protection of the present disclosure.

Figure 1:
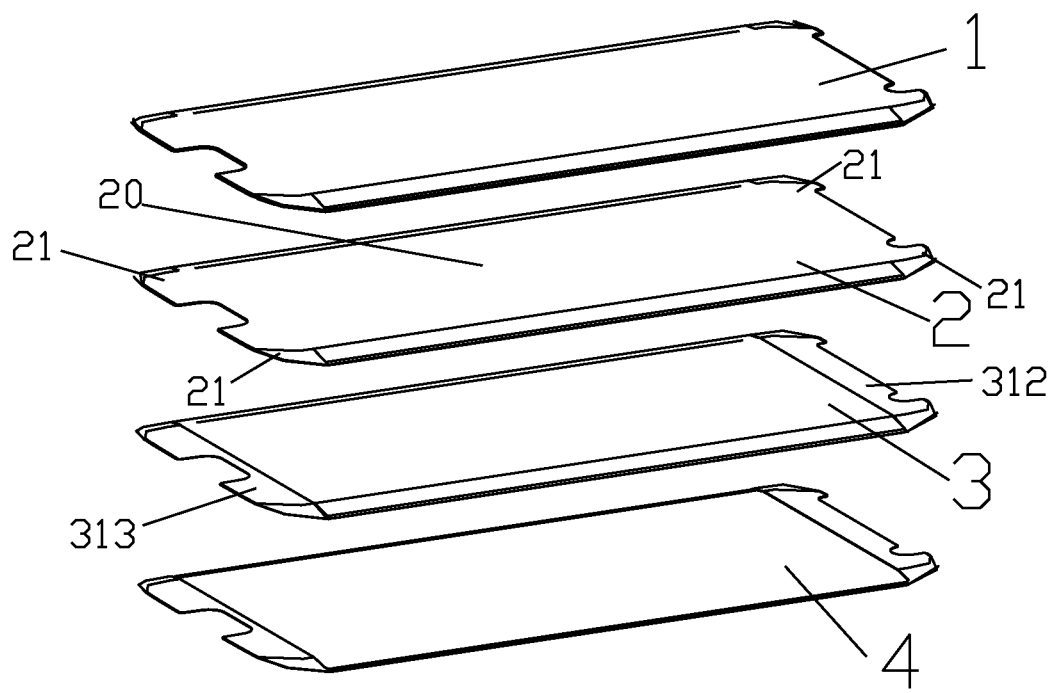
FIG. 1 is an exploded view of a curved film for a mobile phone provided by the first embodiment of the present disclosure.

Referring to FIG. 1, FIG. 1 is a structure diagram of a curved film for a mobile phone provided by a specific example of the present application. As shown in FIG. 1, the curved film from top to bottom includes in sequence a curved glass layer 1, a TPU layer 2, an explosion-proof film 3 and an adhesive layer 4.

The curved film provided by the present application is provided with a TPU layer. The TPU has excellent tension force and tensile force, excellent toughness and excellent aging resistance. Meanwhile, the TPU is an environment-friendly material and has extremely good shock resistance. Therefore, the curved film provided with the TPU has good performances of shock proofing and screen protection and thus has an advantage of protecting mobile phone screens against shattering.

Preferably, the TPU layer includes a central region 20 and four corners 21, wherein the four corners each has a thickness greater than that of the central region. Such arrangement can prevent the curved film from shattering. According to a large number of data, over 80% curved films are shattered at the four corners, accordingly, increasing the thickness of the four corners of the TPU layer can effectively improve the effect of shock proofing.

Figure 2:
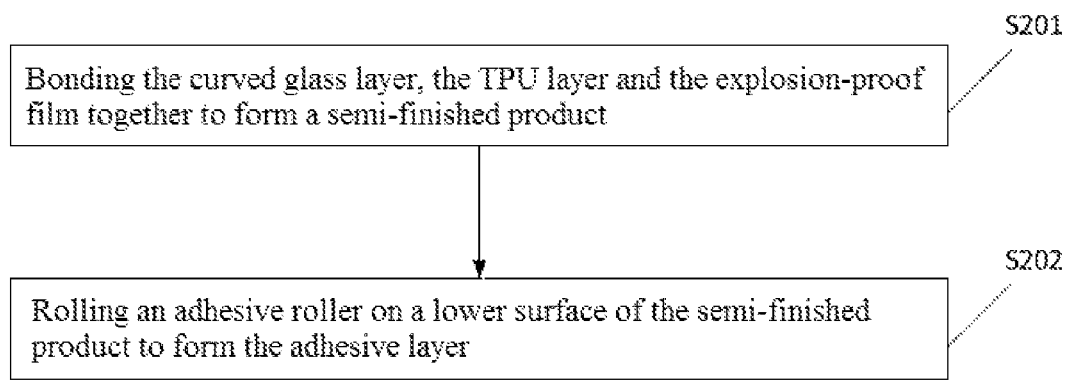
FIG. 2 is a flowchart of a production method provided by the first embodiment of the present disclosure.

The present application further provides a production method for the curved film. The method, as shown in FIG. 2, includes the following steps:

S201: bonding the curved glass layer, the TPU layer and the explosion-proof film together to form a semi-finished product.

S202: rolling an adhesive roller on a lower surface of the semi-finished product to form the adhesive layer.

Preferably, the specific implementation process of the step S202 includes: rolling the adhesive roller on the lower surface of the explosion-proof film 3 to form the adhesive layer, wherein the gap between the central axis of the adhesive roller and the central region 20 of the lower surface of the explosion-proof film 3 may be a constant C, the gap L1 between the central axis of the adhesive roller and the first edge region 312 (which also can be the right edge region) of the lower surface of the explosion-proof film 3 is L1=C+lg(w−m+1), wherein m is a distance from a point y1 of the first edge region 312 in contact with the edge of the adhesive roller to a bottom line of the explosion-proof film 3, and w is the maximum value (which can be a preset value) of the first edge region 312 in the direction of x axis; the gap L2 between the central axis of the adhesive roller and a second edge region 313 (which also can be the left edge region) of the lower surface of the explosion-proof film 3 is L2=C+lg(s−n+1), wherein n is a distance from a point y2 of the second edge region (which, for example, can be a special shaped region, that is, the region of the camera) in contact with the edge of the adhesive roller to the top line of the explosion-proof film 3, and s is the maximum value (which can be another preset value) of the second edge region in the direction of x axis.

With respect to the edge region, the gap between the central axis of the adhesive roller and the curved explosion-proof film 3 is set to be the above function, which can avoid the condition that adhesive drawing appears on the adhesive layer of the edge region. Experimental analysis shows that, if the adhesive roller is separated suddenly from the curved explosion-proof film 3 when the adhesive layer is formed (that is, the gap changes from value C to the separation directly, namely to infinity), adhesive drawing appears on the edge region.

Experimental analysis also shows that the adhesive drawing may be avoided if the gap is increased gradually from value C to the separation and that the resulting adhesive layer is more uniform, it is much easier to adhere and will not generate air bubbles. Experiments show that the adhesive layer has the optimal effect when the gap is: C+lg(w−m+1).

Preferably, the four corners of the TPU layer each has a thickness greater than that of the central region, and the production method for the TPU layer includes the following:

adding a preset set amount of polyether diol and diisocyanate into a reaction vessel, heating the reaction vessel to 85 degrees centigrade while stirring at a rotating speed of 10 rps, vacuumizing the reaction vessel so that the vacuum degree is lower than −0.08 Mpa and then keeping still for 1 hour; next, adding a preset amount of diol chain-extender, vacuumizing the reaction vessel while stirring at a rotating speed of 20 rps so that the vacuum degree is lower than −0.1 Mpa, heating the reaction vessel to 120 degrees centigrade, reducing the rotating speed from 20 rps to 10 rps evenly, keeping 10 rps for 30 minutes, and then stopping stirring and releasing vacuum; and next, adding polytetrafluoroethylene, heating to 125 degrees centigrade, then keeping for 4 hours at 125 degrees centigrade, and then naturally cooling to obtain the TPU; finally, cutting the TPU on the central region of the reaction vessel into a preset size to obtain the TPU layer, putting the TPU on the edge region of the reaction vessel into a heating print head of a 3D printer and heating to 130 degrees centigrade, controlling the print head of the 3D printer to print a thickened layer with a preset thickness at the four corners of the TPU layer of the preset size, and cooling to obtain the TPU layer.

The above reaction has a chemical formula as follows.

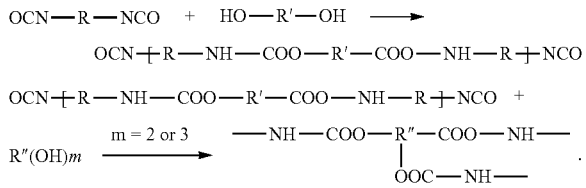

The values of the rotating speeds must be set to be in a double relationship, preferably selecting 10 rps and 20 rps respectively. If the rotating speeds are set to other values, the viscosity of the TPU would be obviously reduced in the condition that the rotating speed is too high and the production time is too long. As a result, the TPU on the central region of the vessel is not flat enough. Consequently, the utilization of the TPU that can be used is lowered and the cost is increased.

Those skilled in the art should understand that the present disclosure is not limited to the action sequence described above. According to the present disclosure, some steps may be conducted in other sequences or simultaneously. Those skilled in the art should also understand that the embodiments mentioned in the description all belong to preferred embodiments and that the involved actions and modules are not necessarily needed by the present disclosure.

In the above embodiments, the description of each embodiment has its own emphasis. What not described in detail in some embodiment can refer to the relevant description of other embodiments.

Those of ordinary skill in the art can understand that all or part steps in each method of the above embodiments may be implemented by instructing related hardware through a computer program. The computer program may be stored in a computer readable storage medium and may include a flash disk, a Read-Only Memory (ROM) or Random Access Memory (RAM), a disk or compact disk, etc.

The above is a detailed introduction for the content download method, related equipment and system provided by the embodiments of the present disclosure. Specific examples are adopted in this paper to illustrate the principle and implementation of the present disclosure. The description of the above embodiments is merely to help the understanding of the method and core idea of the present disclosure. Meanwhile, for the ordinary skill in the field, changes may be made to the specific implementation and the application scope according to the idea of this application. In conclusion, the content of this description should not be understood as a limit to this application.

What is claimed is:

1. A production method for a curved film for a mobile phone, comprising the following steps:
   bonding a curved glass layer, a thermoplastic urethane layer and an explosion-proof film together to form a semi-finished product; and
   rolling an adhesive roller on a lower surface of the semi-finished product to form an adhesive layer; wherein four corners of the thermoplastic urethane layer each has a thickness greater than that of the central region, and the production method for the thermoplastic urethane layer comprises the following:
   adding a preset set amount of polyether diol and diisocyanate into a reaction vessel, heating the reaction vessel to 85 degrees centigrade while stirring at a rotating speed of 10 rps, vacuumizing the reaction vessel so that the vacuum degree is lower than −0.08 Mpa and then keeping still for 1 hour; adding a preset amount of diol chain-extender, vacuumizing the reaction vessel while stirring at a rotating speed of 20 rps so that the vacuum degree is lower than −0.1 Mpa, heating the reaction vessel to 120 degrees centigrade, reducing the rotating speed from 20 rps to 10 rps evenly and keeping at 10 rps for 30 minutes, and then stopping stirring and releasing vacuum; and adding polytetrafluoroethylene, heating to 125 degrees centigrade, then keeping for 4 hours at 125 degrees centigrade, and then naturally cooling to obtain the thermoplastic urethane; finally, cutting the thermoplastic urethane on the central region of the reaction vessel into a preset size to obtain the thermoplastic urethane layer, putting the thermoplastic urethane on the edge region of the reaction vessel into a heating print head of a 3D printer and heating to 130 degrees centigrade, controlling the print head of the 3D printer to print a thickened layer with a preset thickness at the four corners of the thermoplastic urethane layer of the preset size, and cooling to obtain the thermoplastic urethane layer.

* * * * *